(12) United States Patent
Saylor, III et al.

(10) Patent No.: US 8,607,861 B2
(45) Date of Patent: Dec. 17, 2013

(54) METAL-TO-METAL SEAL WITH RETENTION DEVICE

(75) Inventors: James E. Saylor, III, Conroe, TX (US); Sudarsanam Chellappa, Houston, TX (US)

(73) Assignee: Smith International, Inc., Houston, TX (US)

( * ) Notice: Subject to any disclaimer, the term of this patent is extended or adjusted under 35 U.S.C. 154(b) by 371 days.

(21) Appl. No.: 12/910,505

(22) Filed: Oct. 22, 2010

(65) Prior Publication Data

US 2011/0095485 A1 Apr. 28, 2011

Related U.S. Application Data

(60) Provisional application No. 61/254,132, filed on Oct. 22, 2009.

(51) Int. Cl.
E21B 23/00 (2006.01)

(52) U.S. Cl.
USPC ............ 166/216; 166/134; 166/182; 166/217

(58) Field of Classification Search
USPC .................................. 166/216, 214, 182, 134
See application file for complete search history.

(56) References Cited

U.S. PATENT DOCUMENTS

| | | | | |
|---|---|---|---|---|
| 3,684,010 A | * | 8/1972 | Young | 166/129 |
| 4,471,965 A | | 9/1984 | Jennings et al. | |
| 5,020,599 A | * | 6/1991 | Lau | 166/301 |
| 5,129,660 A | * | 7/1992 | Taylor et al. | 277/328 |
| 5,174,376 A | * | 12/1992 | Singeetham | 166/208 |
| 5,325,925 A | * | 7/1994 | Smith et al. | 166/387 |
| 5,511,620 A | | 4/1996 | Baugh et al. | |
| 2003/0079887 A1 | | 5/2003 | Lloyd et al. | |
| 2010/0052261 A1 | * | 3/2010 | Maldonado | 277/322 |

FOREIGN PATENT DOCUMENTS

| | | |
|---|---|---|
| EP | 0553997 A2 | 8/1993 |
| EP | 1647744 A1 | 4/2006 |
| GB | 2244502 A | 12/1991 |
| GB | 2279118 A | 12/1994 |
| GB | 2444826 A | 6/2008 |
| GB | 2463144 A | 3/2010 |

OTHER PUBLICATIONS

Combined Search and Examination Report issued in corresponding British Patent Application No. GB1017813.5; Dated Jan. 18, 2011 (8 pages).

* cited by examiner

*Primary Examiner* — Giovanna Wright
(74) *Attorney, Agent, or Firm* — Jeffery R. Peterson; Brandon Clark

(57) ABSTRACT

A downhole tool includes a first portion having a first metal protrusion configured to seal against a first metal surface and a second portion having a second metal protrusion configured to seal against a second metal surface. A ratcheting device includes a first element having a plurality of grooves, and a second element having at least two sets of teeth, wherein one of the at least two sets of teeth engages the plurality of grooves. Additionally, a method of forming a downhole seal includes disposing in a wellbore a downhole tool including an inner tubular, a lock ring, a lower ring, an upper ring, an insert ring, and a deformable element. The method further includes moving a wedge sleeve axially downward with respect to the downhole tool such that the wedge sleeve engages the deformable ring and forces a first metal protrusion on the deformable element into contact with an outer tubular.

26 Claims, 8 Drawing Sheets

METAL-TO-METAL SEAL WITH RETENTION DEVICE

CROSS-REFERENCE TO RELATED APPLICATION

The present application claims priority to U.S. Provisional Patent Application Ser. No. 61/254,132, filed Oct. 22, 2009, and is hereby incorporated by reference in its entirety.

BACKGROUND OF INVENTION

1. Field of the Invention

Embodiments disclosed herein generally relate to a method and apparatus for creating a seal. More specifically, embodiments disclosed herein relate to a method and apparatus for creating and retaining a metal-to-metal seal between two surfaces.

2. Background Art

Wellbore completions operations often require the make-up of a leak-proof seal across an annular space formed between an inner tubular and an outer tubular. Because the seals are implemented in downhole environments, the seals are often exposed to high temperatures, high pressures, and corrosive fluids. Each seal is expected to provide a reliable leak-proof seal over its lifetime.

Typically, downhole seals include elastomeric components designed to prevent fluids from passing through crevices and gaps disposed between adjoining pieces of downhole equipment. However, elastomeric components tend to deteriorate over time due to exposure to high temperatures, high pressures, and corrosive fluids. As a result, the deteriorated elastomeric component may not provide a reliable seal and may fail, thereby allowing fluid to seep past.

During installation, elastomeric components fitted on downhole equipment may be exposed to axial forces from fluids or other equipment in the well which may cause removal, or "swabbing off," of the elastomeric component. Adhesives and various mechanical support features have been developed in order to prevent swabbing off of the elastomeric component.

Also known in the art are seals having an elastomeric component in combination with a metal component. For example, U.S. Pat. No. 5,511,620 ("Baugh") shows embodiments having metal seal points that engage a wellbore surface through a resilient material.

Accordingly, there exists a need for a method and apparatus for creating and retaining a metal-to-metal seal between two surfaces.

SUMMARY OF INVENTION

In one aspect, the embodiments disclosed herein relate to a downhole tool including a first portion having a first metal protrusion configured to seal against a first metal surface and a second portion having a second metal protrusion configured to seal against a second metal surface.

In another aspect, the embodiments disclosed herein relate to a ratcheting device including a first element having a plurality of grooves, and a second element having at least two sets of teeth, wherein one of the at least two sets of teeth engages the plurality of grooves.

In yet another aspect, the embodiments disclosed herein relate to a method of forming a downhole seal including disposing in a wellbore a downhole tool including a mandrel, a lock ring, a lower ring, an upper ring, an insert ring, and a deformable ring, and moving a wedge sleeve axially downward with respect to the downhole tool such that the wedge sleeve engages the deformable ring and forces a first metal protrusion on the deformable ring into contact with an outer tubular.

Other aspects and advantages of the invention will be apparent from the following description and the appended claims.

DETAILED DESCRIPTION

In one aspect, embodiments disclosed herein relate to a method and apparatus for creating a seal within an annulus. More specifically, embodiments disclosed herein relate to a method and apparatus for creating and retaining a metal-to-metal seal between two surfaces.

Figure 1:
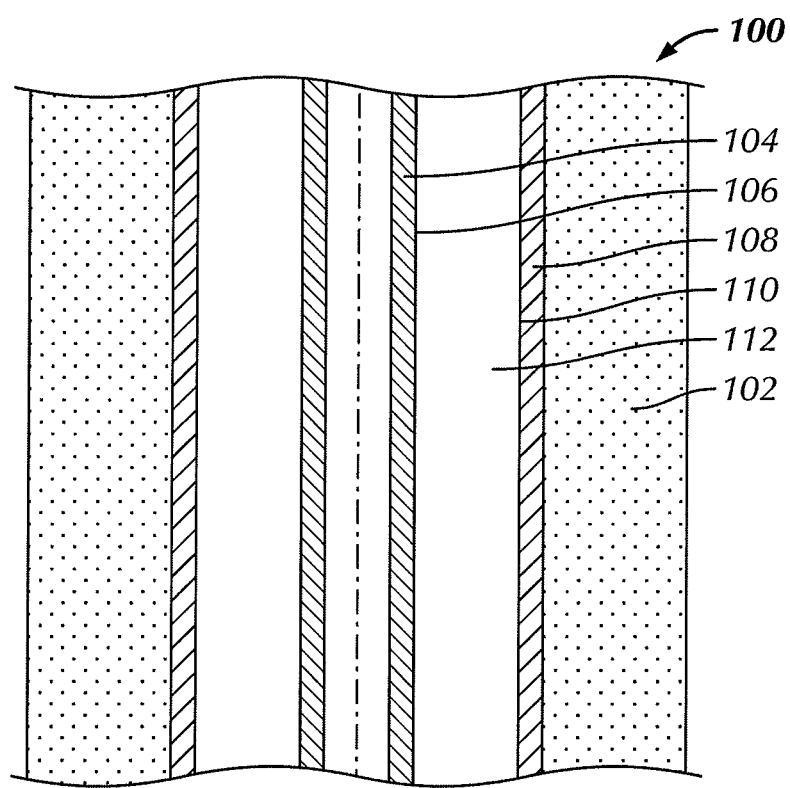
FIG. 1 is a partial cross-sectional view of a wellbore having inner and outer tubulars.

Referring initially to FIG. 1, a section of a wellbore 100 is shown drilled in formation 102. An outer tubular 108 having an inner surface 110 is shown disposed around inner tubular 104 having an outer surface 106. An annulus 112 is formed between inner surface 110 of outer tubular 108 and outer surface 106 of inner tubular 104. Inner tubular 104 and outer tubular 108 may be made of metal. In select embodiments, inner tubular 104 may be a portion of a drill string and outer tubular 108 may be a portion of a casing. In certain embodiments disclosed herein, a downhole tool may be used to create a metal-to-metal seal across annulus 112. In select embodiments, a ratcheting device (not shown) may be used to energize the metal-to-metal seal.

Figure 2:
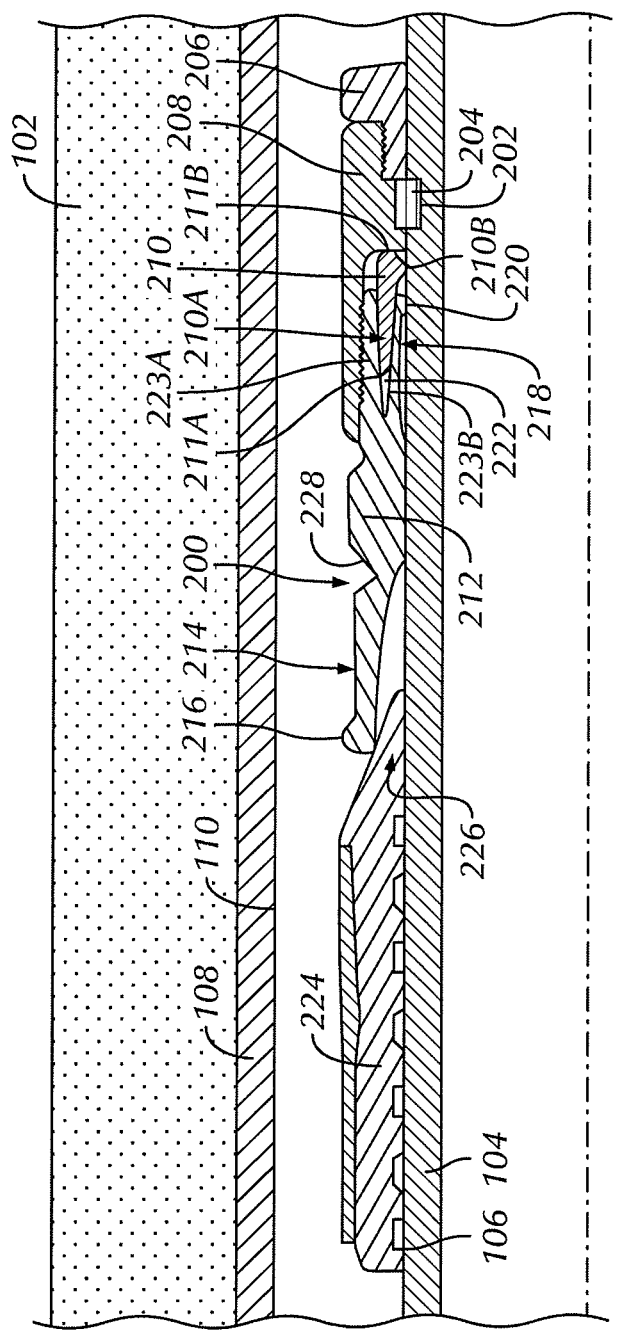
FIG. 2 is a partial cross-sectional view of a downhole tool in accordance with embodiments disclosed herein.
Figure 3:
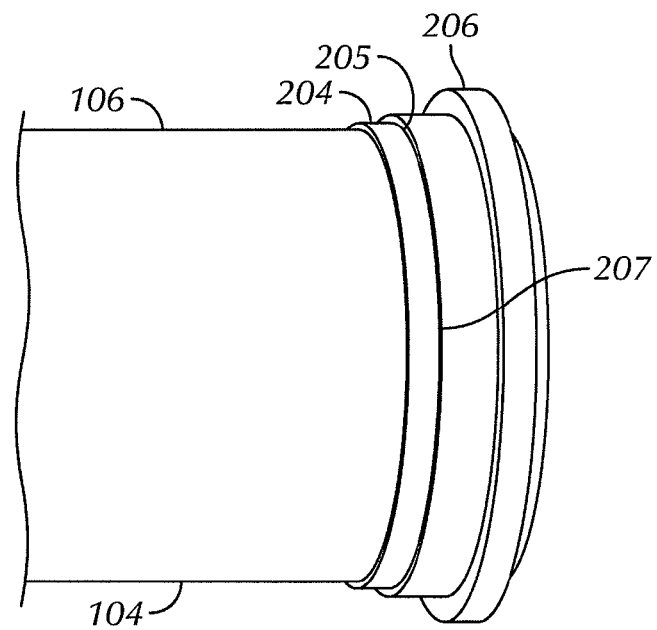
FIG. 3 is a perspective view of a downhole tool in accordance with embodiments disclosed herein.

Referring now to FIG. 2, a partial cross-sectional view of a downhole tool 200 in accordance with embodiments disclosed herein is shown. Outer surface 106 of inner tubular 104 is shown in partial cross-sectional view. In certain embodiments, outer surface 106 may include a notch 202 configured to receive and to hold in place a lock ring 204. A lower ring 206 may be positioned below lock ring 204 such that lower ring 206 contacts lock ring 204. Referring briefly to FIG. 3, a perspective view of a downhole tool having lock ring 204 and lower ring 206 disposed around outer surface 106 of inner tubular 104 is shown. From FIG. 3, it can be seen that an upper surface 207 of lower ring 206 contacts a lower surface 205 of lock ring 204 such that upward movement of lower ring 206 may be prevented.

Referring back to FIG. 2, an upper ring 208 may be positioned above lock ring 204 such that a lower surface of upper ring 208 contacts an upper surface of lock ring 204, thereby preventing downward movement of upper ring 208. By connecting lower ring 206 and upper ring 208 across lock ring 204, both upward and downward longitudinal displacement of upper ring 208 and lower ring 206 with respect to inner tubular 104 may be prevented. Lower ring 206 and upper ring 208 may be connected using, for example, a threaded connection. However, those of ordinary skill in the art will appreciate that in other embodiments, the connection may be made using alternative types of connections, such as, for example, adhesives, welds, or other mechanical fasteners. The assembly of lock ring 204, lower ring 206, and upper ring 208 may hold other components of downhole tool 200 in place such that the other components may be prevented from moving axially with respect to inner tubular 104.

Insert ring 210 may be installed above and/or radially inward of upper ring 208. In certain embodiments, insert ring 210 may be sized to fit into a space formed between inner tubular 104 and an upper portion of upper ring 208. Insert ring 210 may include a tapered portion 210a that extends axially, as shown, and the width of tapered portion 210a may increase from tip 211a to base 211b. Additionally, insert ring 210 may include a radial spacing portion 210b that contacts first surface 106 of inner tubular 104, thereby allowing insert ring 210 to maintain concentric positioning with respect to inner tubular 104.

A lower end 218 of deformable element 212 may be connected over insert ring 210 to an upper portion of upper ring 208. During the connection of deformable element 212 with upper ring 208, a recess 222 formed between an outer portion 223a and an inner portion 223b of the lower end 218 of deformable element 212 may engage tapered portion 210a of insert ring 210. Those of ordinary skill in the art will appreciate that, although in this embodiment a threaded connection is shown between deformable element 212 and upper ring 208, any means for connecting these two elements may be used such as, for example, adhesives, welds, or other mechanical fasteners. As deformable element 212 engages upper ring 208, deformable element 212 may move axially downward with respect to upper ring 208 and insert ring 210, thereby wedging insert ring 210 into recess 222 formed in deformable element 212. As insert ring 210 is wedged between outer portion 223a and inner portion 223b of deformable element 212, recess 222 widens and a lower metal protrusion 220 formed on the inner portion 223b of lower end 218 of deformable element 212 is forced into contact with outer surface 106. The force between lower metal protrusion 220 and outer surface 106 may be sufficient to form a seal. In certain embodiments, the force applied to lower metal protrusion 220 may result in deformation of lower metal protrusion 220 against outer surface 106.

Figure 4:
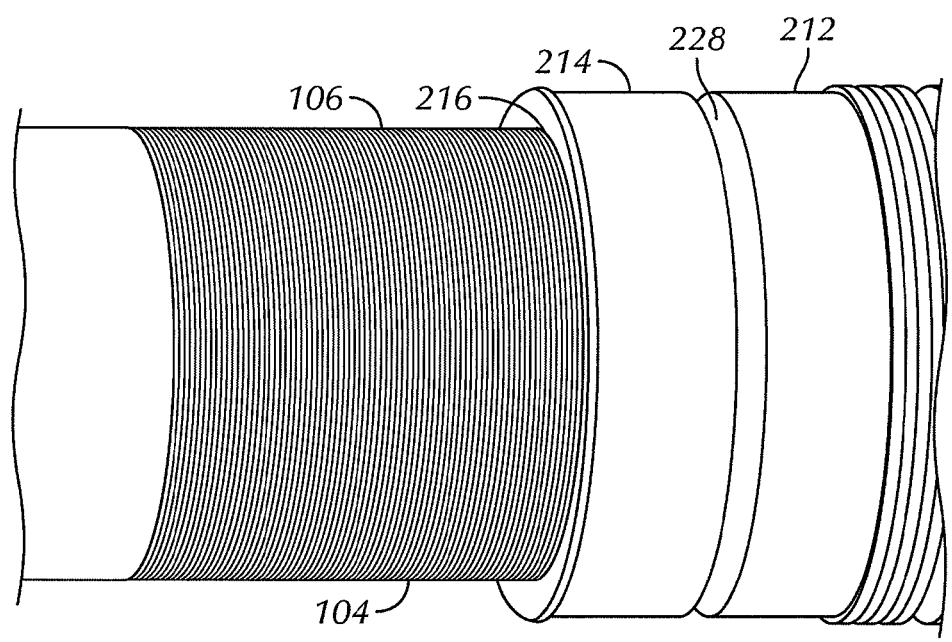
FIG. 4 is a perspective view of a downhole tool in accordance with embodiments disclosed herein.

Referring now to FIGS. 2 and 4 together, a partial cross-sectional view and a perspective view, respectively, of a downhole tool in accordance with embodiments disclosed herein are shown. In addition to the features discussed above, deformable element 212 may include an upper portion 214 having an upper metal protrusion 216. In certain embodiments, upper metal protrusion 216 and/or lower metal protrusion 220 may be substantially rounded. Alternatively, the substantially rounded upper metal protrusion 216 and/or the substantially rounded lower metal protrusion 220 may have a flat portion (not shown) disposed on an outer circumference and an inner circumference of the upper metal protrusion 216 and lower metal protrusion 220, respectively, such that the flat portions may be configured to contact inner surface 110 and outer surface 106, respectively. In such embodiments, the flat portion may measure between approximately 0.01 inches and approximately 0.03 inches. Additionally, upper metal protrusion 216 and lower metal protrusion 220 may be made of stainless steel, such as grade 316 stainless steel. Deformable element 212 may also include a notch 228 integrally formed on an outer surface of upper portion 214. Notch 228 may allow upper portion 214 of deformable element 212 to deform radially outwardly as a result of an applied force, thereby creating a seal between upper metal protrusion 216 and inner surface 110 of outer tubular 108. To apply a force to deformable element 212, a wedge ring 224 may be used.

Wedge ring 224 may be disposed above deformable element 212 and may include a nose 226 configured to wedge between outer surface 106 of inner tubular 104 and an inner surface of upper portion 214 of deformable element 212 during deformation. In certain embodiments, nose 226 may include a non-stick coating applied to an outer surface of nose 226 to reduce friction between nose 226 and upper portion 214 of deformable element 212. The non-stick coating may be any non-stick coating known in the art such as, for example, Xylan®, Teflon®, or other fluoropolymers.

It will be appreciated by those skilled in the art that the components of downhole tool 200 discussed above, including lock ring 204, lower ring 206, upper ring 208, insert ring 210, deformable element 212, and wedge ring 224, may be assembled on inner tubular 104 prior to being inserted into outer tubular 108 disposed in wellbore 100. In certain embodiments, lower metal protrusion 220 may be forced against outer surface 106 of inner tubular 104 prior to being inserted into wellbore 100 such that a seal may be formed therebetween. After downhole tool 200 is run downhole, upper metal protrusion 216 may be forced against inner surface 110 to form a seal, as will be discussed below.

After being inserted into outer tubular 108, a force or pressure may be applied to wedge ring 224 in an axially downward direction, thereby moving wedge ring 224 axially downward with respect to deformable element 212. Nose 226 of wedge ring 224 may be configured to transfer force to upper portion 214 of deformable element 212. Thus, as wedge ring 224 moves axially downward, nose 226 forces upper portion 214 of deformable element 212 radially outward. Upper portion 214 may deform at notch 228 disposed in deformable element 212. In certain embodiments, upper metal protrusion 216 may be pressed against inner surface 110, thereby forming a seal between inner tubular 104 and outer tubular 108. In select embodiments, the force between upper metal protrusion 216 and inner surface 110 may result in deformation of upper metal protrusion 216 against inner surface 110.

Once a lower seal is formed between lower metal protrusion 220 and outer surface 106 and an upper seal is formed between upper metal protrusion 216 and inner surface 110, a seal may be provided across annulus 112. Specifically, in the embodiment wherein outer surface 106 and inner surface 110 are metal surfaces, the seal across annulus 112 may be a metal-to-metal seal because deformable element 212 may also be made of metal.

Once a seal between upper metal protrusion 216 and inner surface 110 is achieved, it may be necessary to prevent wedge ring 224 from moving axially upward with respect to deformable element 212 to maintain the metal-to-metal seal. In certain embodiments, wedge ring 224 may be prevented from moving axially upward by a retention device disposed on wedge ring 224.

Figure 5:
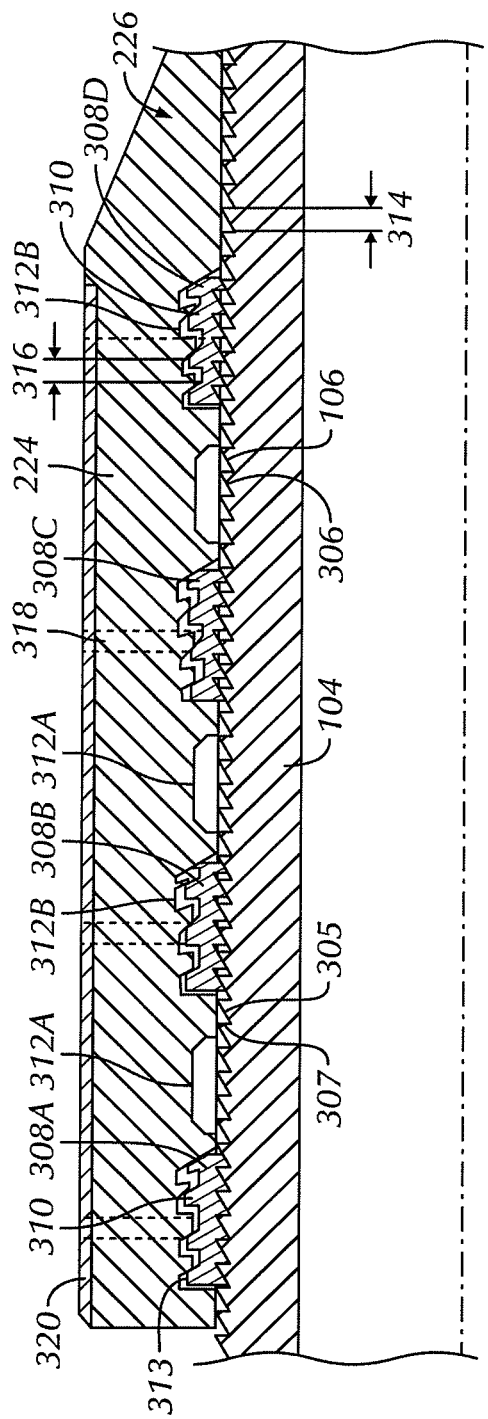
FIG. 5 is a partial cross-sectional view of a ratcheting device in accordance with embodiments disclosed herein.
Figure 6A:
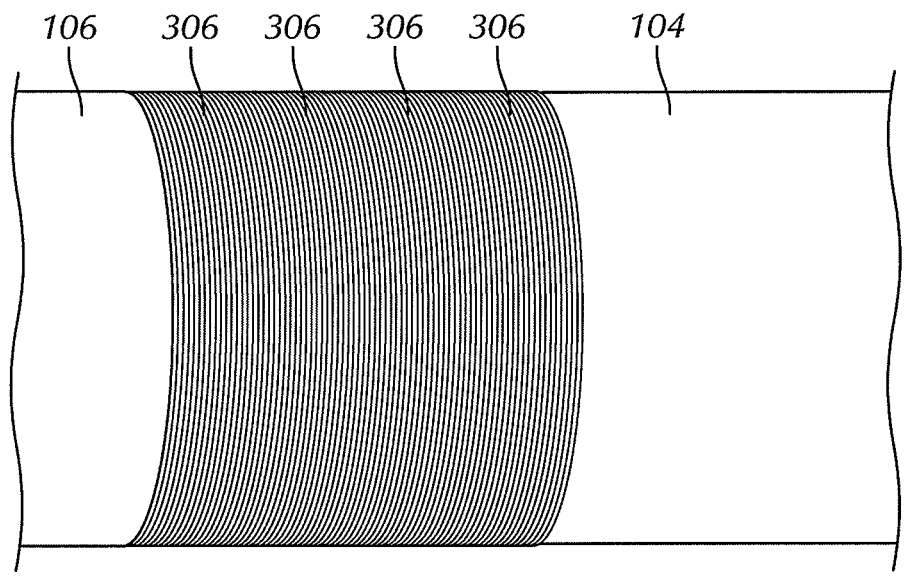
FIGS. 6A, 6B, 6C, 6D, and 6E are perspective views of a downhole tool in accordance with embodiments disclosed herein.

Referring to FIG. 5, a detailed partial cross-sectional view of a retention device 500 in accordance with embodiments disclosed herein is shown. Retention device 500 may include inner tubular 104 and wedge ring 224. Inner tubular 104 may include a plurality of circumferential grooves 306 disposed on an outer surface and having a groove pitch 314, while wedge ring 224 may include one or more sets of teeth 308 having a tooth pitch 316. Those of ordinary skill in the art will appreciate that pitch may be defined as a length between two groove peaks or tooth peaks. In certain embodiments, grooves 306 may be disposed continuously along the surface of inner tubular 104, as shown in FIG. 5. In other embodiments, grooves 306 may be disposed in a plurality of sets along outer surface 106 of inner tubular 104, as shown in FIG. 6A.

It will be appreciated that although four sets of teeth 308 are shown, any number of sets of teeth may be used. In certain embodiments, at least two sets of teeth 308 may be used and, in other embodiments, at least three sets of teeth 308 may be used. Additionally, the size of tooth pitch 316 may be substantially equal to that of groove pitch 314, or may vary from the size of groove pitch 314.

Figure 6B:
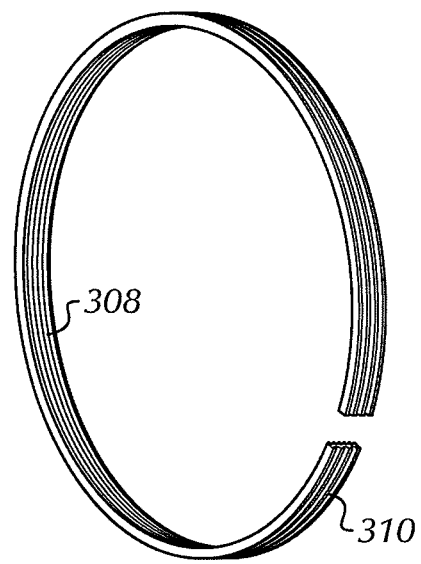
Figure 6C:
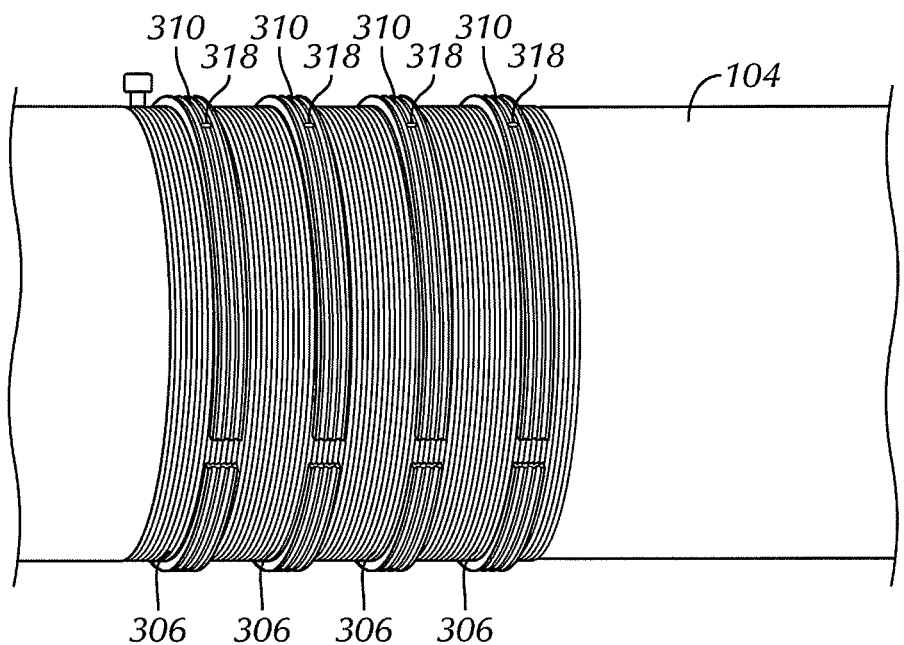
Figure 6D:
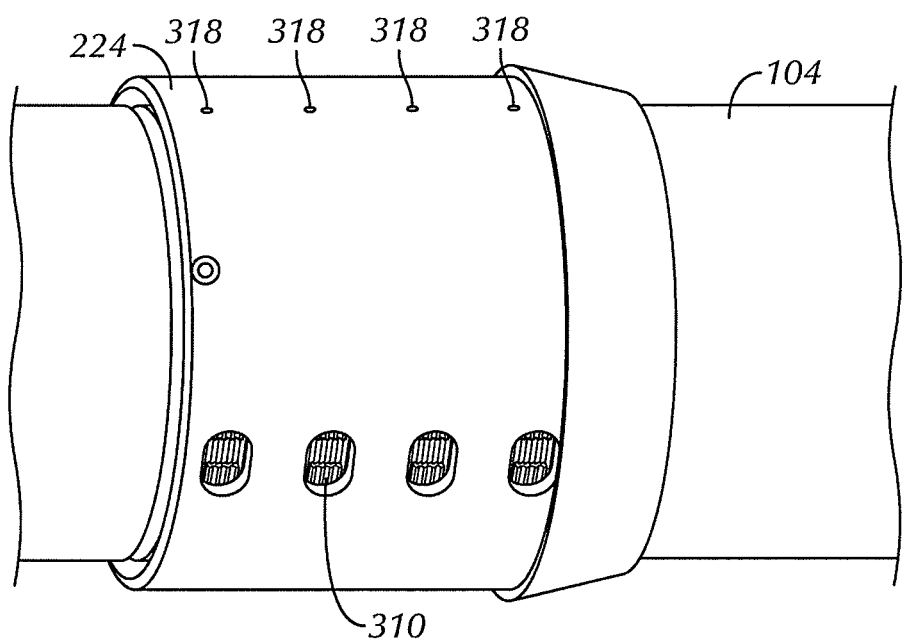
Figure 6E:
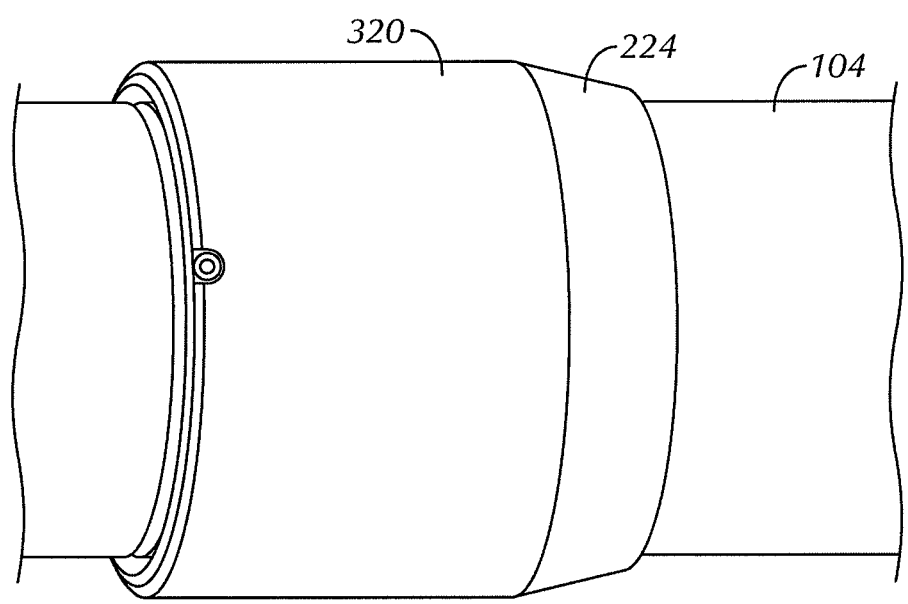

Still referring to FIG. 5, wedge ring 224 may include cutouts 312a to reduce the amount of surface area in contact with inner tubular 104, and thus, the amount of friction between inner tubular 104 and wedge ring 224. In some embodiments, cutouts 312a may be circumferential grooves or notches formed in an inner surface of wedge ring 224. Cutouts 312b may be configured to receive snap rings 310 having sets of teeth 308 disposed thereon. Alternatively, sets of teeth 308 may be machined or otherwise integrally formed with wedge ring 224 such that cutouts 312b are not needed. In certain embodiments, a top surface 313 of snap rings 308 may be substantially smooth, such that cutouts 312b are not required. An exemplary snap ring 310 is shown in FIG. 6B. In an embodiment having sets of teeth 308 disposed on snap rings 310, wedge ring 224 may include a plurality of holes 318 configured to allow a plurality of screws (not shown) to pass through wedge ring 224 and into contact with snap rings 310. In certain embodiments, screws may be used to hold snap rings 310 in place with respect to wedge ring 224. Alternatively, a pin (not shown) may be friction fit into holes 318 such that movement of snap rings 310 with respect to wedge ring 224 is prevented. Referring briefly to FIGS. 6C and 6D, snap rings 310 having holes 318 are shown positioned around inner tubular 104. Additionally, FIG. 6D shows wedge ring 224 disposed around snap rings 310 and inner tubular 104. In certain embodiments, a cover 320 configured to cover the plurality of holes 308 may be installed around an outer surface of wedge ring 224, as shown in FIG. 6E.

Referring back to FIG. 5, grooves 306 of inner tubular 104 may be aligned with respect to teeth 308 of wedge ring 224, such that at least one of the plurality of sets of teeth 308 may engage the plurality of grooves 306. In certain embodiments, at least two of the sets of teeth 308a, 308b, 308c, and 308d may engage grooves 306 simultaneously. In other embodiments, as shown in FIG. 5, set of teeth 308a may engage grooves 306 while sets of teeth 308b, 308c, 308d are not engaged with grooves 306. In certain embodiments, the retention device may include a ratcheting mechanism to allow movement of wedge ring 224 with respect to inner surface 110 in one direction while limiting movement of wedge ring 224 with respect to inner surface 110 in another direction. In such an embodiment, the angle of a lower surface 305 of grooves 306 slopes in a direction such that downward movement of wedge ring 224 is allowed, but an upper surface 307 of grooves 306 may be substantially perpendicular to a central annulus axis such that the upper surface of grooves 306 and a surface of sets of teeth 308 engage and prevent upward movement.

At least one set of teeth 308 may engage grooves 306 such that the engagement set of teeth 308 and grooves 306 prevents upward movement of wedge ring 224. Spacing between sets of teeth 308a, 308b, 308c, and 308d with respect to grooves 306 may be chosen such that each set of teeth 308 alternatingly engages grooves 306 once per pitch length of forward axial movement. As such, the amount of possible backward axial movement, or "backlash," may be reduced to a fraction of the pitch length. For example, in the embodiment shown in FIG. 5, set of teeth 308A engages grooves 306 while the remaining sets of teeth 308B, 308C, 308D are offset from engagement with grooves 306. As wedge ring 224 moves axially downward in the direction allowed by the configuration of grooves 306 and sets of teeth 308, set of teeth 308D may be next to engage grooves 306. Similarly, sets of teeth 308C, 308B may be the third and fourth sets of teeth to engage grooves 306, respectively. In the embodiment shown in FIG. 5, the amount of possible backlash may be less than approximately ¼ of the pitch length of grooves 306 and teeth 308 because at least one of the four sets of teeth 308 may engage upper surface 307 of grooves 306 if moved approximately ¼ of a pitch length. One of ordinary skill in the art will appreciate that the amount of possible backlash may be further reduced by using additional sets of teeth and/or by decreasing the pitch length of grooves 306 and/or teeth 308.

Figure 7:
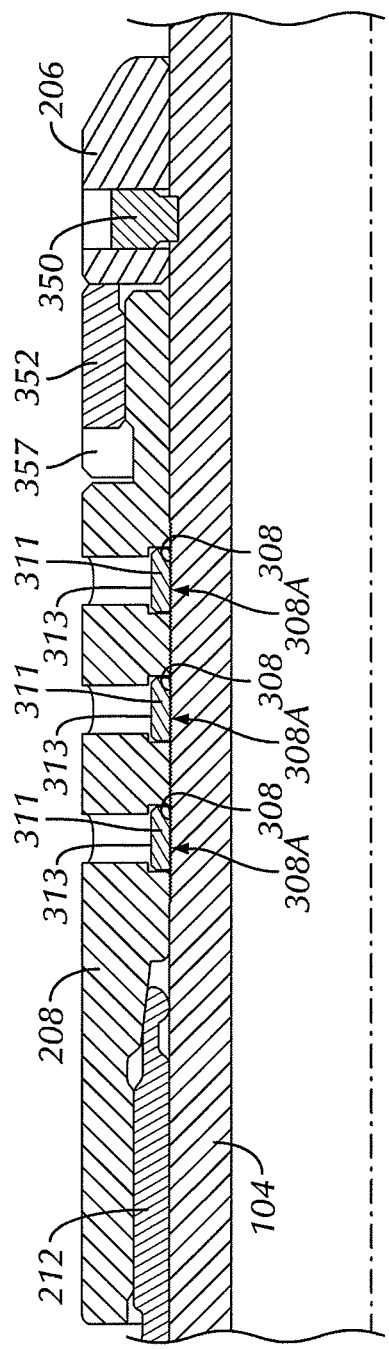
FIG. 7 is a cross-sectional view of a downhole tool in accordance with embodiments disclosed herein.

Referring to FIG. 7, an alternative design of a downhole tool according to embodiments of the present disclosure is shown. In this embodiment, a lower end of deformable element 212 is configured to interface with upper ring 208 without an insert ring 210. As illustrated, when engaged, deformable element 212 is torqued together with upper ring 208, thereby not requiring the lower metal protrusion 220 (as illustrated in FIG. 2). The downhole tool also includes lower snap rings 311 configured to prevent downward movement of upper ring 208 as a setting load is applied to wedge ring 224 (of FIG. 2) to establish an upper metal seal between surfaces 216 and 110 (of FIG. 2). As illustrated, lower snap rings 311 may have a smooth top surface 313 that contacts upper ring 208. Multiple sets of teeth 308 may be configured to engage corresponding teeth 308A of inner tubular 104. Lower snap rings 311 are oriented opposite snap rings 310, thereby preventing downward movement, as snap rings 310 prevent upward movement. Thus, the addition of lower snap rings 311 may thereby allow prevent downward movement of upper ring 208 as a setting load is applied to wedge ring 224 (of FIG. 2).

After upper ring 208 and deformable element 212 have been torqued together to create the bottom seal, as explained above, a lower ring 206 may be threadingly engaged with a set screw 350 to secure lower ring 206. A second set screw 351 may then be loosened to allow retention ring 352 (which is threaded to upper ring 208) to be backed off to contact lower ring 206 and then second set screw 351 may be retightened. Lower ring may thus serve as a guide ring while tripping the hole.

Advantageously, wedge ring 224 having sets of teeth 308 in accordance with embodiments disclosed herein may reduce the amount of backlash experienced with respect to inner tubular 104, and in certain embodiments, wedge ring 224 may be substantially prevented from moving axially upward upon the release of a downward force or pressure. Upper metal protrusion 216 on deformable element 212 may thereby be prevented from losing contact with inner surface 110, and thus, the metal-to-metal seal may be maintained. One of ordinary skill will appreciate that the retention device disclosed herein with respect to energizing a metal-to-metal seal may be used in a variety of applications wherein backlash prevention is desired such as, for example, liner hangers and packers.

The metal-to-metal seal disclosed herein may advantageously provide a leak-proof seal without the use of elastomeric components which may deteriorate over time as a result of exposure to high temperatures, high pressures, and/or harmful chemicals. As such, a metal-to-metal seal in accordance with embodiments disclosed herein may provide increased reliability over the life of the seal. Advantageously, a metal-to-metal seal in accordance with embodiments disclosed herein may provide an effective seal in environments having high temperatures, high pressures, and harmful chemical fluids.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A downhole tool comprising:
    a deformable member comprising:
        an upper portion having an upper metal protrusion configured to seal against a first metal surface; and
        a lower portion having a lower metal protrusion configured to seal against a second metal surface; and
    a wedge sleeve configured to transfer force to the deformable element, the wedge sleeve comprising a retention device having at least one element having at least two sets of teeth associated therewith, wherein one of the at least two sets of teeth engages an inner tubular.

2. The downhole tool of claim 1, wherein the upper metal protrusion is substantially round.

3. The downhole tool of claim 2, wherein the upper metal protrusion comprises a first flat surface between approximately 0.01 inches and 0.03 inches.

4. The downhole tool of claim 1, wherein the lower protrusion is substantially round.

5. The downhole tool of claim 4, wherein the lower protrusion comprises a second flat surface between approximately 0.01 inches and 0.03 inches.

6. The downhole tool of claim 1, wherein at least one of the upper metal protrusion and the lower metal protrusion comprise at least one selected from a group consisting of stainless steel, aluminum, and a nickel-chromium alloy.

7. The downhole tool of claim 1, wherein the lower portion comprises a recess configured to expand to allow contact between the lower metal protrusion and the second metal surface.

8. The downhole tool of claim 1, wherein the upper portion comprises a notch configured to deform to allow contact between the upper metal protrusion and the first metal surface.

9. The downhole tool of claim 8, wherein the upper metal protrusion expands radially to contact the first metal surface.

10. The downhole tool of claim 9, wherein downward longitudinal movement of the wedge sleeve forces the upper metal protrusion to contact the first metal surface.

11. The downhole tool of claim 10, wherein the wedge sleeve comprises a nose having a non-stick coating.

12. The downhole tool of claim 11, wherein the non-stick coating comprises a fluoropolymer.

13. A retention device comprising:
    a first element having a plurality of grooves; and
    a second element having at least two sets of teeth;
    wherein at any given time, one of the at least two sets of teeth engages the plurality of grooves, and are disposed on at least two rings configured to be inserted into the first element.

14. The retention device of claim 13, wherein the second element has at least three sets of teeth.

15. The retention device of claim 14, wherein only one of the at least three sets of teeth engages the plurality of grooves at a given time.

16. The retention device of claim 14, wherein two of the at least three sets of teeth engage the plurality of grooves at a given time.

17. The retention device of claim 13, wherein the plurality of grooves are continuous along the first element.

18. The retention device of claim 13, wherein the at least two sets of teeth are integrally formed with the first element.

19. The retention device of claim 13, wherein the plurality of grooves have a groove pitch and wherein the at least two sets of teeth have a tooth pitch.

20. The retention device of claim 19, wherein the groove pitch and the tooth pitch are substantially equal.

21. The retention device of claim 13, wherein the second element comprises a nose.

22. A method of forming a downhole seal comprising:
    disposing a downhole tool in a wellbore, the downhole tool comprising:
        mandrel;
        a lock ring;
        a lower ring;
        an upper ring;
        an insert ring; and
        deformable element;
    moving a wedge sleeve axially downward with respect to the downhole tool such that the wedge sleeve engages the deformable element and forces a first metal protrusion on the deformable ring into contact with an outer tubular; and
    engaging a plurality of teeth associated with the wedge sleeve with a surface of the mandrel such that the wedge sleeve moves unidirectionally relative to the mandrel.

23. The method of claim 22, wherein the mandrel comprises a plurality of grooves, and wherein the wedge sleeve comprises at least two sets of teeth.

24. The method of claim 23, wherein at least one of the at least two sets of teeth engages the plurality of grooves.

25. The method of claim 22, wherein the mandrel comprises a plurality of grooves, and wherein the wedge sleeve comprises at least three sets of teeth.

26. The method of claim 25, wherein at least two of the at least three sets of teeth engage the plurality of grooves.

* * * * *